United States Patent Office 3,285,932
Patented Nov. 15, 1966

3,285,932
SYNTHESIS OF CONDENSED AROMATIC-HETEROCYCLIC RING COMPOUNDS
George E. Illingworth, Mount Prospect, and James J. Louvar, Evanston, Ill., assignors to Universal Oil Products Company, Des Plaines, Ill., a corporation of Delaware
No Drawing. Filed May 21, 1964, Ser. No. 369,289
10 Claims. (Cl. 260—319.1)

This invention relates to the preparation of condensed aromatic-heterocyclic ring compounds, particularly benzofuran, 2-methylbenzofuran, and the like, as well as their sulfur and nitrogen analogs.

The catalytic dehydrocyclization of o-ethylphenol and o-allylphenol to form benzofuran and 2-methylbenzofuran respectively, has been disclosed in the art, dehydrocyclization being effected in the presence of palladium or platinum on charcoal. It is an object of this invention to effect said dehydrocyclization reaction in the presence of a novel catalyst with respect thereto, which catalyst does not give extensive cleavage of reactant and/or product as previously observed.

In one of its broad aspects, this invention embodies a process for the preparation of a condensed aromatic-heterocyclic ring compound which comprises contacting an aromatic compound containing an aliphatic side chain in a position adjacent to a substituent selected from the group consisting of hydroxy, mercapto and amino with a catalyst at dehydrocyclization reaction conditions, said catalyst comprising a noble metal and at least one metal of Groups I and II of the Periodic Table composited with a refractory inorganic oxide, condensing said aliphatic side chain with said adjacent substituent and forming a condensed aromatic-heterocyclic ring compound.

Another embodiment of this invention is in a process for the preparation of a condensed mononuclear aromatic-heterocyclic ring compound which comprises contacting a mononuclear aromatic compound containing an aliphatic side chain in ortho position to a hydroxy substituent with a catalyst at dehydrocyclization reaction conditions, said catalyst comprising platinum and lithium composited with alumina, condensing said aliphatic side chain with said hydroxy substituent and forming a condensed mononuclear aromatic-heterocyclic ring compound.

One of the more specific embodiments relates to a process for the preparation of 2-methylbenzofuran which comprises contacting o-allylphenol with a catalyst comprising platinum and from about 0.01 to about 0.7 wt. percent lithium composited with alumina at a temperature of from about 400° C. to about 550° C., and forming said 2-methylbenzofuran.

Other objects and embodiments of this invention will become apparent with reference to the following detailed specification.

In the proces of dehydrocyclization, a dehydrogenation reaction occurs, one hydrogen atom being extracted from the hydroxy, mercapto or amino substituent as the case may be, and at least one hydrogen atom being extracted from the aliphatic side chain. Condensation of the hydroxy, mercapto or amino substituent with the aliphatic side chain occurs at the β carbon atom thereof with evolution of the hydrogen to complete the dehydrocyclization process, forming a five membered heterocyclic ring in condensed relationship with the aromatic nucleus. Although hydrogen is evolved during the course of this reaction, it has been observed that the inclusion of further amounts of hydrogen in the reaction mixture is beneficial in maintaining a clean catalyst over extended periods of operation.

Aromatic compounds which may be treated pursuant to the process of this invention to form condensed aromatic-heterocyclic derivatives thereof may comprise a benzene nucleus containing an aliphatic side chain in ortho position to a hydroxy, mercapto, or amino group, or condensed benzene nuclei containing an aliphatic side chain in a position adjacent to a hydroxy, mercapto, or amino group. In either case, the aliphatic side chain may be alkyl or alkenyl, preferably 2-alkenyl, said aliphatic side chain containing up to about 15 carbon atoms. Aromatic compounds which can be utilized thus include o-ethylphenol,
o-propylphenol,
o-isopropylphenol,
o-butylphenol,
o-(sec-butyl)phenol,
o-amylphenol,
o-(sec-amyl)phenol,
o-isoamylphenol, etc.,
o-ethylthiophenol,
o-propylthiophenol,
o-isopropylthiophenol,
o-butylthiophenol,
o-(sec-butyl)thiophenol,
o-amylthiophenol,
o-(sec-amyl)thiophenol,
o-isoamylthiophenol, etc.,
o-ethylaniline,
o-propylaniline,
o-isopropylaniline,
o-butylaniline,
o-(sec-butyl)aniline,
o-amylaniline,
o-(sec-amyl)aniline,
o-isoamylaniline, etc., and also
o-allylphenol,
o-(butenyl)phenol,
o-(2-methyl-2-propenyl)phenol,
o-(2-pentenyl)phenol,
o-allylthiophenol,
o-(2-butenyl)thiophenol,
o-(2-methyl-2-propenyl)thiophenol,
o-(2-pentenyl)thiophenol, etc.,
o-allylaniline,
o-(2-butenyl)aniline,
o-(2-methyl-2-propenyl)aniline,
o-(2-pentenyl)aniline, and the like. Also included are those related aromatic compounds comprising condensed benzene nuclei containing said aliphatic side chain in a position adjacent to a hydroxy, mercapto, or amino group, which compounds are suitable in the preparation of condensed aromatic-heterocyclic derivatives thereof, the aromatic portion of said derivative comprising said condensed nuclei. Suitable aromatic compounds thus further include 1-ethyl-2-naphthol,
2-ethyl-3-naphthol,
1-allyl-2-naphthol,
2-allyl-3-naphthol, 1-propyl-2-naphthol,
2-propyl-3-naphthol, etc.,
1-ethyl-2-thionaphthol,
2-ethyl-3-thionaphthol,
1-allyl-2-thionaphthol,
2-allyl-3-thionaphthol,
1-propyl-2-thionaphthol,
2-propyl-3-thionaphthol, etc.,
1-ethyl-2-naphtholamine,
2-ethyl-3-naphtholamine,
1-allyl-2-naphtholamine,
2-allyl-3-naphtholamine,
1-propyl-2-naphtholamine,
2-propyl-3-naphtholamine,
etc., as well as the anthracene, phenanthrene, etc., homologs thereof. It is further contemplated that the aromatic nucleus may contain other than the described substituents provided they are substantially inert at dehydrocyclization reaction conditions.

The process of the present invention makes use of a refractory inorganic oxide carrier material with which is composited a noble metal component and a metal of Groups I and II of the Periodic Table, i.e., an alkali metal and/or alkaline earth metal component. It is understood that the noble metal and/or other metal component may be present either as the element, or as a chemical compound, or in physical association with the other catalytic components.

The noble metal may be present as such or as a chemical compound thereof, or in physical or chemical association with the refractory inorganic oxide, or with the alkali metal, or in combination with both. Similarly, the alkali metal may be present as such, or as a chemical compound thereof, or in physical or chemical association with the refractory inorganic oxide, the noble metal or in combination with both. The noble metal component may be platinum, palladium, ruthenium, rhodium, etc. It appears that the utilization of either platinum and/or palladium yields more advantageous results, and these noble metals are, therefore, preferred. In general, the platinum component will comprise from about 0.01 wt. percent to about 1.0 wt. percent, calculated as the element of the final catalyst composite. The alkali metal and/or alkaline earth metal component, such as cesium, lithium, rubidium, sodium, calcium, magnesium and/or strontium, will comprise not more than about 5.0 wt. percent of the final catalyst composite. In order to achieve the proper balance between inhibiting the occurrence of side reactions, and imparting the desired degree of stability to the noble metal-containing catalyst, it is preferred to employ the alkali and alkaline earth metals in significantly lower concentrations. Therefore, it is preferred to utilize a catalyst comprising from about 0.01 wt. percent to about 0.7 wt. percent alkali and/or alkaline earth metal calculated as the free element. The particularly preferred refractory inorganic oxide, for use as the carrier material for the catalytically active metallic components, comprises an alumina-containing material. The utilization of other refractory inorganic oxides in conjunction with the alumina is generally dependent upon the desire to impart thereto certain desired physical and/or chemical characteristics. Thus, minor quantities of silica, titania, zirconia, boria, etc., may be utilized in combination with the alumina without removing the resulting catalytic composites from the broad scope of the present invention.

The catalyst utilized in this process may be prepared in any conventional or otherwise convenient manner, and it is understood that the particular method of manufacture is neither essential to or limiting upon the present invention. In general, alumina will be prepared by reacting a suitable alkaline reagent, including ammonium hydroxide, ammonium carbonate, etc., with a salt of aluminum including aluminum chloride, aluminum sulfate, aluminum nitrate, etc. The substances are intimately admixed under conditions which form aluminum hydroxide which, upon subsequent heating and drying, forms alumina. In those instances where it is desired to incorporate one or more other refractory inorganic oxides with the alumina, the same may be accomplished through any suitable means including separate, successive, or coprecipitation methods. Similarly, a halogen compound may be introduced into the catalyst and either before or after formation of the alumina. The halogen preferably is added in the form of an aqueous solution of the hydrogen halide or a volatile salt thereof, such as ammonium chloride, and/or ammonium fluoride. The manufacturing procedure is facilitated when the halogen and other components are combined prior to the addition thereto of the noble metal component, such as platinum. The platinum component is composited in any suitable manner, generally by way of an impregnating procedure wherein a water-soluble platinum compound is employed. Suitable platinum compounds include chloroplatinic acid, platinic fluoride, platinous chloride, etc. The alkali metal, or alkaline earth metal, component is added as an aqueous solution of a suitable salt thereof, and thus may comprise a chloride, sulfate, nitrate, etc., of lithium, sodium, calcium, rubidium, magnesium, strontium, and/or cesium. It is understood that the platinum, alkali metal and/or alkaline earth metal component may be added to the alumina hydroxide or alumina in any manner, and in any step of the catalyst preparation as desired. It is generally advisable to introduce the platinum at a later step of the preparation in order that this relatively expensive metallic component will not be lost due to subsequent processing in the washing and purification treatments.

After all of the catalytic components have been composited, the catalyst will generally be dried at a temperature within the range of from about 30 to about 150° C., for a period of from about 2 to about 24 hours. Rapid drying is to be avoided since the sudden evolution of gas will cause the catalyst particles to rupture and otherwise become strained. Following the drying of the catalyst, it is subjected to a calcination treatment at a temperature of from about 425° to about 600° C. for a period of from about 2 to about 12 hours. The catalyst is utilized in a reduced state, reduction usually being effected at a temperature of from about 400° C. to about 550° C. in a hydrogen atmosphere just prior to use.

Dehydrocyclization reaction conditions relate principally to temperature, a temperature of from about 400° C. to about 600° C. being operable, a temperature of from about 450° C. to about 550° C. being preferred. The process is generally carried out in the vapor phase at from about atmospheric or slightly superatmospheric pressure.

The following examples are presented in illustration of the process of the present invention and are not intended as a limitation on the generally broad scope of this invention as set out in the appended claims.

*Example I*

In this example, illustrating the preparation of 2-methylbenzofuran, o-allylphenol is charged to a ⅞″ I.D. vertical tubular reactor jacketed with a thermostatically controlled electric heating element and containing 100 grams of catalyst disposed in a fixed bed therein, said catalyst comprising alumina spheres containing platinum and lithium composited therewith so as to comprise 0.75 wt. percent and 0.274 wt. percent respectively of the catalyst composite. The catalyst is prepared by the simultaneous impregnation of alumina spheres with a single aqueous impregnating solution of lithium hydroxide and chloroplatinic acid in amounts sufficient to yield the indicated quantities of the metals, 0.274% and 0.75% by weight respectively, calculated as the elements thereof. The impregnated spherical particles were then dried over a water bath at about 100° C., and subsequently calcined for a period of about 5 hours at a temperature of about 550° C. and a hydrogen atmosphere. The ortho-allyl phenol is charged to the reactor at a rate of 15 cubic centimeters per hour and passes downflow through the catalyst bed in admixture with nitrogen introduced as a diluent, the reactor being maintained at a temperature of about 550° C. The reactor effluent is cooled and recovered in a receiver equipped with an overhead water condenser. The 2-methylbenzofuran product is recovered from the liquid product by distillation in about a 45% yield.

*Example II*

Ortho-propyl phenol is charged to a reactor substantially as described and containing 100 grams of catalyst disposed in a fixed bed therein, said catalyst comprising alumina spheres containing platinum and lithium composited therewith so as to comprise 0.75 wt. percent and 0.274 wt. percent respectively of the catalyst composite. The ortho-propyl phenol is charged to the reactor at a rate of about 15 cc. per hour and passes downflow through the catalyst bed in admixture with nitrogen introduced as a diluent, the reactor being maintained at a temperature at about 550° C. The reactor effluent is cooled and recovered in a receiver equipped with an overhead water condenser. The 2-methylbenzofuran product is recovered from the liquid product by distillation in about 8.5 percent yield in this once-through operation.

*Example III*

The sulfur analog of 2-methylbenzofuran, 2-methylbenzothiofuran, is prepared by charging ortho-allylthiophenol to a reactor substantially as described and containing a catalyst bed comprising alumina spheres containing platinum and lithium composited therewith so as to comprise 0.75 wt. percent and 0.274 wt. percent respectively of the catalyst composite. The ortho-allylthiophenol is charged at a rate of about 15 cc. per hour per 100 g. of catalyst, the reactor being maintained at a temperature of about 550° C. The desired 2-methylbenzothiofuran is recovered from the cooled reactor effluent by distillation methods.

*Example IV*

Ortho-ethylphenol is charged to a reactor substantially as described and containing a catalyst bed comprising alumina spheres containing platinum and lithium composited therewith so as to comprise 0.75 wt. percent to about 0.274 wt. percent respectively of the catalyst composite. The ortho-ethylphenol is charged to the reactor at a rate of about 15 cc. per hour and passes downflow through the catalyst bed in admixture with nitrogen introduced as a diluent, the reactor being maintained at a temperature of about 550° C. The reactor effluent is cooled and recovered in a receiver equipped with an overhead water condenser. The benzofuran product is recovered from the liquid product by distillation methods.

*Example V*

Indole, the nitrogen analog of benzofuran, is prepared by charging ortho-ethylaniline to a reactor substantially as described and containing a catalyst bed comprising alumina spheres containing platinum and lithium composited therewith so as to comprise 0.75 wt. percent and 0.274 wt. percent respectively of catalyst composite. The ortho-ethylaniline is charged at a rate of about 15 cc. per hour per 100 g. of catalyst, the reactor being maintained at a temperature of about 550° C. The desired indole is recovered from the cooled reactor effluent by distillation methods.

We claim as our invention:

1. A process for the preparation of a condensed aromatic-heterocyclic ring compound which comprises contacting an aromatic carbocyclic compound containing an alkyl or alkenyl side chain in a position adjacent to a substituent selected from the group consisting of hydroxy, mercapto and amino with a catalyst at dehydrocyclization reaction conditions, said catalyst comprising a noble metal and lithium composited with an alumina-containing support, condensing said side chain with said adjacent substituent and forming a condensed aromatic-heterocyclic ring compound.

2. A process for the preparation of a condensed aromatic-heterocyclic ring compound which comprises contacting a mononuclear aromatic carbocyclic compound containing a alkyl or alkenyl side chain in a position adjacent to a substituent selected from the group consisting of hydroxy, mercapto and amino with a catalyst at dehydrocyclization reaction conditions, said catalyst comprising a noble metal and lithium with an alumina-containing support, condensing said side chain with said adjacent substituent and forming a condensed aromatic-heterocyclic ring compound.

3. A process for the preparation of a condensed aromatic-heterocyclic ring compound which comprises contacting a mononuclear aromatic carbocyclic compound containing an alkyl or alkenyl side chain in ortho position to a hydroxy substituent with a catalyst at dehydrocyclization reaction conditions, said catalyst comprising platinum and lithium composited with an alumina-containing support, and condensing said side chain with said hydroxy substituent and forming a condensed aromatic-heterocyclic ring compound.

4. A process for the preparation of a condensed aromatic-heterocyclic ring compound which comprises contacting a mononuclear ortho-alkylphenol or a mononuclear ortho-alkenylphenol with a catalyst at dehydrocyclization reaction conditions, said catalyst comprising platinum and lithium composited with an alumina-containing support, condensing the alkyl or alkenyl substituent of said phenol with the hydroxy substituent thereof and forming a condensed aromatic-heterocyclic ring compound.

5. A process for the preparation of a condensed aromatic-heterocyclic ring compound which comprises contacting a mononuclear ortho-alkylphenol or a mononuclear ortho-alkenylphenol with a catalyst at dehydrocyclization reaction conditions, said catalyst comprising platinum and lithium composited with alumina, condensing the alkyl or alkenyl substituent of said phenol with the hydroxy substituent thereof and forming a condensed aromatic-heterocyclic ring compound.

6. A process for the preparation of 2-methylbenzofuran which comprises contacting ortho-allylphenol with a catalyst at a temperature of from about 400° C. to about 550° C., said catalyst comprising alumina containing platinum and from about 0.01 to about 0.7 wt. percent lithium composited therewith, and forming said 2-methylbenzofuran.

7. A process for the preparation of 2-methylbenzofuran which comprises contacting ortho-propylphenol with a catalyst at a temperature of from about 400° C. to about 550° C., said catalyst comprising alumina containing platinum and from about 0.01 to about 0.7 wt. percent lithium composited therewith, and forming said 2-methylbenzofuran.

8. A process for the preparation of benzofuran which comprises contacting ortho-ethylphenol with a catalyst at a temperature of from about 400° C. to about 550° C., said catalyst comprising alumina containing platinum and from about 0.01 to about 0.7 wt. percent lithium composited therewith, and forming said benzofuran.

9. A process for the preparation of 2-methylbenzothiofuran which comprises contacting ortho-allylthiophenol with a catalyst at a temperature of from about 400° C. to about 550° C., said catalyst comprising alumina containing platinum and from about 0.01 to about 0.7 wt. percent lithium composited therewith, and forming said 2-methylbenzothiofuran.

10. A process for the preparation of indole which comprises contacting ortho-ethylaniline with a catalyst at a temperature of from about 400° C. to about 550° C., said catalyst comprising alumina containing platinum and from about 0.01 to about 0.7 wt. percent lithium composited therewith, and forming said indole.

References Cited by the Examiner
UNITED STATES PATENTS

| | | | |
|---|---|---|---|
| 2,694,074 | 11/1954 | Kemp | 260—330.5 |
| 2,891,965 | 6/1959 | Voltz et al. | 260—319 |
| 2,953,575 | 9/1960 | Erner et al. | 260—319 |

OTHER REFERENCES

Hansch et al.: Jour. Amer. Chem. Soc., vol. 73, July 1951, pages 3080–3802.

Krause: Chemical Abstracts, vol. 54, 1960, par. 10994b.

ALEX MAZEL, *Primary Examiner.*

HENRY R. JILES, *Examiner.*

MARY U. O'BRIEN, *Assistant Examiner.*